United States Patent [19]
Yang

[11] Patent Number: 5,250,892
[45] Date of Patent: Oct. 5, 1993

[54] BATTERY CHARGE WITH TEMPERATURE-SENSITIVE CUT-OFF SWITCH

[76] Inventor: Tai-Her Yang, 5-1 Taipin St. Si-Hu Town, Dzan-Hwa, Taiwan

[21] Appl. No.: 861,003

[22] Filed: Mar. 31, 1992

[30] Foreign Application Priority Data

Apr. 5, 1991 [GB] United Kingdom ............ 9107102

[51] Int. Cl.⁵ .................................... H02J 7/04
[52] U.S. Cl. .................................... 320/35; 320/2
[58] Field of Search .................... 320/35, 36, 2

[56] References Cited

U.S. PATENT DOCUMENTS

| | | | |
|---|---|---|---|
| 3,928,792 | 12/1975 | Mullersman et al. | 320/35 |
| 3,935,525 | 1/1976 | Elson et al. | 320/35 |
| 4,164,719 | 8/1979 | Young et al. | 335/14 |
| 5,031,987 | 7/1991 | Norling | 350/96.15 |

*Primary Examiner*—R. J. Hickey
*Attorney, Agent, or Firm*—Bacon & Thomas

[57] ABSTRACT

A battery charger includes a battery compartment removable from the charger socket. The battery compartment includes a temperature-sensitive switch which opens when the temperature of the battery exceeds a predetermined value during charging, thereby cutting off the main charging current. A permanent magnet is positioned on the socket portion of the charger. The magnet latches the temperature-sensitive switch in an open position after charging so long as the battery compartment is in the socket. The switch can be reset by separating the battery compartment from the socket. A current limiting resistor is connected in parallel with the switch to maintain a small charging current when the temperature-sensitive switch is open.

4 Claims, 1 Drawing Sheet

BATTERY CHARGE WITH TEMPERATURE-SENSITIVE CUT-OFF SWITCH

BACKGROUND OF THE INVENTION

1. Field of the Invention

This invention relates to a battery charger with an automatic cut-off feature.

2. Description of Related Art

Conventional battery chargers involve a multitude of parts in a complex structure so that production cannot be accomplished at a reasonable cost and reliability.

In general, conventional automatic cut-off chargers include electronic component assemblies for charging the battery via a temperature controlled switch which opens when the battery charge approaches a predetermined limit (e.g., 0.1 C or 10% current of rated AH) and the battery gets too hot. However, such circuits have heretofore involved complex parts so that production cannot be accomplished at reasonable cost.

SUMMARY OF THE INVENTION

The present invention relates to a battery charger having a temperature controlled magnetic switch which opens when a battery is charged. When the battery is charged and the temperature controlled magnetic switch opens, the circuit automatically provides a small current for maintaining the charge, and further by means of the attraction provided by a magnet on the battery charger, enables the temperature controlled magnetic switch to maintain the open circuit until the battery is removed from the charger and the temperature is so reduced as to reach the condition of restoration for the temperature controlled magnetic switch. The small current for maintaining the charge is obtained because the temperature control magnetic switch is connected in parallel to a limiter resistance.

DETAILED DESCRIPTION OF THE PREFERRED EMBODIMENTS

As noted above, the present invention relates to a battery charger having a temperature controlled magnetic switch which opens when a battery is charged. When the battery is fully charged and the temperature controlled magnetic switch opens, the circuit may automatically provide a small current for maintaining the charge, and further by means of the attraction provided by a magnet on the battery charger, enables the temperature controlled magnetic switch to maintain the open circuit until the battery is removed from the charger and the temperature is so reduced as to reach the condition the condition of restoration for the temperature controlled magnetic switch. The small current for maintaining the charge on the battery is obtained because the temperature controlled magnetic switch connected in parallel to a limiter resistance.

Figure 1:
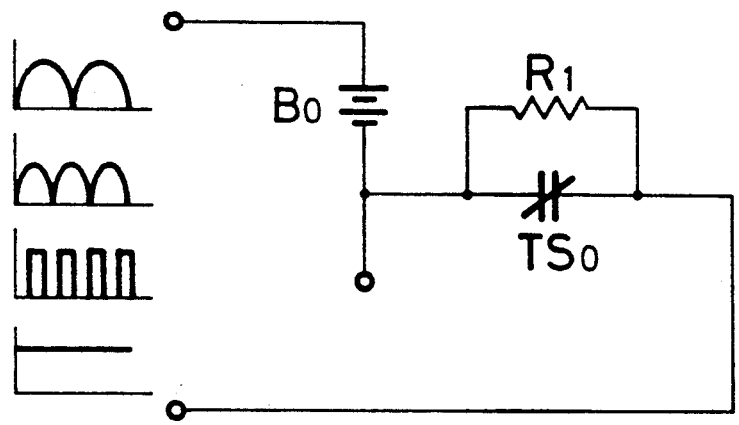
FIG. 1 is a diagram showing the circuit of a battery charger according to a preferred embodiment of the invention.

FIG. 1 is a diagram showing the circuit of the preferred battery charger, including a magnet for maintaining an open circuit in a temperature controlled magnetic switch-based automatic charging cut-off device. The circuit includes, for example, a known DC, semi-wave DC, full-wave DC, or intermittent pulse DC power supply (depicted schematically by waveform sketches in FIG. 1), a chargeable battery Bo, and a built-in temperature control switch TSo. A choking resistance R1 is connected in parallel to the temperature controlled magnetic switch TSo. Because of the current supplied by the resistant $R_1$, when the temperature of a chargeable battery rises more than a predetermined temperature and the temperature controlled magnetic switch opens, the circuit can still maintain a maximum desired charge for the chargeable battery, despite the attraction of the magnet located on the battery charger, which retains the temperature controlled magnetic switch in an open-circuit state until the power supply is switched OFF or the battery is removed and the circuit is interrupted.

The conditions for the restoration of the circuit, i.e., for closing of the switch after opening, include:

(1) reduction in the temperature sensed by the temperature controlled magnetic switch;

(2) removal of the battery from the charger and away from the magnet so that the magnet ceases to attract the temperature controlled magnetic switch.

Figure 2:
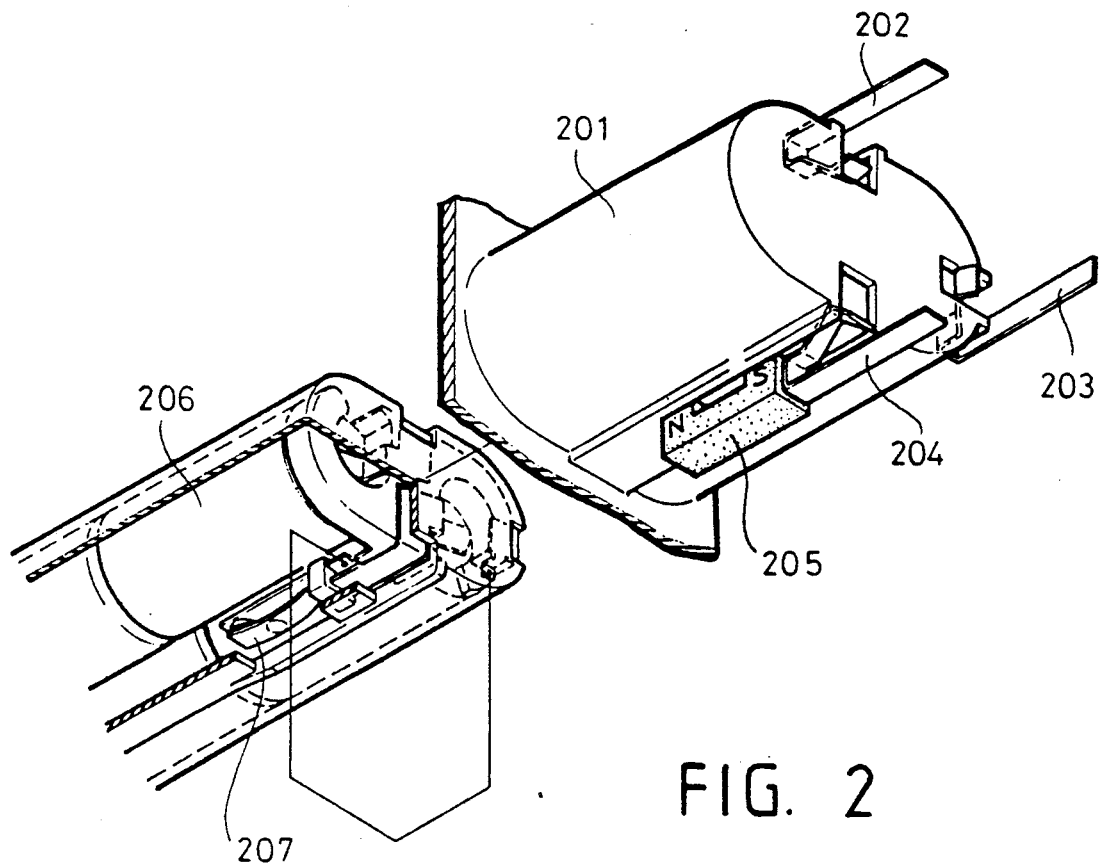
FIG. 2 is a perspective view showing the structure of the battery charger of FIG. 1.

FIG. 2 is a perspective view showing the structure of the battery charger and the magnet for retaining the temperature controlled magnetic switch in an open position. Battery charger socket 201 is an independent structure for engaging a chargeable battery 206 and has electrodes corresponding to those of the battery, in particular the positive and negative electrodes 202, 203, and further includes electrode 204 provided for control or indication purposes. Socket 201 also includes a transformer and other known elements for commutating, indication and control purposes. A magnet 205 is mounted on battery charger socket 201 so as to magnetically couple with the temperature controlled magnetic switch 207 when the battery is engaged with the battery charger, and when the reed of the temperature controlled switch has approached the magnet upon opening of the switch because the temperature has risen sufficiently to indicate a complete charge.

The chargeable battery 206 is accommodated in a compartment which includes the battery and the temperature controlled magnetic switch 207 at a proper position. Each terminal of the temperature controlled magnetic switch 207 is connected in parallel with the limiter resistance $R_1$ and a display device (not shown), which is preferably general an LED or a lamp with a limiter.

In summary, the present invention relates to coupling of a temperature switch of a chargeable battery compartment with a magnet positioned on a battery charger socket in order to maintain an open state of the switch after the switch has opened due to an over-temperature condition, the circuit thereupon switching into a charge-maintenance state by means of a limiter resistance impedance value, such that the chargeable battery continues to be charged by a limited current until it is removed from the charger socket, and the temperature of the temperature controlled magnetic switch has decreased to the point of restoration, whereupon the switch is reset.

What is claimed is:

1. In a battery charger which includes two separable parts and a temperature-sensitive switch arranged to open when a temperature sensed by the switch exceeds a predetermined temperature, said temperature-sensitive switch being positioned in a first of two separable parts, the improvement comprising:

magnetic latching means positioned on a second of said two parts for latching the temperature-sensitive switch in an open position when said first part and said second part are joined together and said switch has opened as a result of an increase in said temperature beyond said predetermined temperature, said magnetic latching means maintaining said switch in said open position after the temperature of the battery falls below said predetermined temperature so long as the two separable parts are together whereby said switch can be reset to a closed position by separating said two parts.

2. A battery charger as claimed in claim 1, wherein said temperature-sensitive switch is connected in parallel with charge maintaining means including a current-limiting resistor for supplying a limited current to the battery, said limited current being sufficient to maintain a charge on the battery while the temperature-sensitive switch is open.

3. A battery charger as claimed in claim 1, wherein said magnetic latching means comprises a permanent magnet.

4. A battery charger as claimed in claim 1, wherein the first part is a battery containing compartment, and the second part is a socket into which the battery containing compartment fits and which is connected to a power supply arranged to supply charging power to the battery when the battery containing compartment is inserted into the socket.

* * * * *